United States Patent [19]

O'Mara

[11] 4,390,487

[45] Jun. 28, 1983

[54] METHOD OF MAKING A LAMINATED RECORDED DISC

[75] Inventor: Kerry D. O'Mara, Trenton, N.J.

[73] Assignee: RCA Corporation, New York, N.Y.

[21] Appl. No.: 343,016

[22] Filed: Jan. 26, 1982

[51] Int. Cl.³ .............................................. B29D 17/00
[52] U.S. Cl. .................................... 264/107; 264/322; 264/325; 264/328.7; 425/810
[58] Field of Search ............ 264/107, 323, 325, 328.7, 264/320, 322; 425/810

[56] References Cited

U.S. PATENT DOCUMENTS

| | | | |
|---|---|---|---|
| 1,488,253 | 3/1924 | Howbrigg | 264/107 X |
| 2,452,821 | 11/1948 | Wood | 18/48.4 |
| 2,996,764 | 8/1961 | Ross | 18/59 |
| 3,247,298 | 4/1966 | Utiger . | |
| 3,339,240 | 9/1967 | Corbett | 18/30 |
| 3,378,612 | 4/1968 | Dietz | 264/45 |
| 3,584,094 | 6/1971 | Rock | 264/107 |
| 3,739,052 | 6/1973 | Ayres | 264/322 X |
| 3,825,637 | 7/1974 | Robin | 264/328.7 X |
| 3,901,958 | 8/1975 | Doll | 264/45.5 |
| 3,921,856 | 11/1975 | Langecker | 222/132 |
| 4,213,927 | 7/1980 | Alberti | 264/107 |
| 4,248,818 | 2/1981 | Elizabeth | 264/107 |
| 4,315,878 | 2/1982 | Van Dorer | 264/107 |
| 4,334,849 | 6/1982 | Bock | 264/107 X |

FOREIGN PATENT DOCUMENTS 842153  7/1960  United Kingdom ................ 264/107

OTHER PUBLICATIONS

S. S. Young et al., A Basic Experimental Study of Sandwich Injection Molding and Sequential Injection, Polymer Engineering & Science, Aug. 1980, vol. 20, No. 12, pp. 798–804.

Primary Examiner—Thomas P. Pavelko
Attorney, Agent, or Firm—B. E. Morris; D. S. Cohen

[57] ABSTRACT

A laminated recorded disc of the type having a core material surrounded by a surface layer of a conductive material is made from a preform having a core surrounded by the conductive material. The preform is made in a mold in which the conductive material is first injected into the mold and then the core material is injected into the conductive material. The disc is made from the preform by placing the preform between the platens of a compression mold and closing the heated platens against the preform. The heated platens heat and apply pressure to the preform to cause the materials of the preform to flow radially outwardly until the materials fill the mold cavity formed by the completely closed platens.

11 Claims, 11 Drawing Figures

METHOD OF MAKING A LAMINATED RECORDED DISC

BACKGROUND OF THE INVENTION

The present invention relates to a method of making a laminated recorded disc and particularly to a method of making a recorded disc having an outer layer of a conductive plastic around a core of plastic material.

A capacitive video disc system has been described by Clemens in U.S. Pat. No. 3,842,194. The disc described comprises a plastic disc containing an information track having audio, video and color information in the form of a surface relief pattern arranged in the surface of the disc which can be played back with a stylus. The video disc of Clemens had a conductive metal coating to provide the conductivity required for capacitive pickup and a thin layer of a dielectric material thereover. An electrode on the playback stylus completed the capacitor.

Improvements have been made in this system whereby the disc is made from a conductive plastic material, as disclosed by Fox et al in copending application Ser. No. 105,550 filed Dec. 20, 1979, which is a continuation of application Ser. No. 818,279 filed July 25, 1977, now abandoned. A polyvinylchloride based molding composition is mixed with sufficient amounts of finely divided carbon black particles so that the resulting composition has the conductivity required for capacitive playback. A thin layer of the polyvinylchloride surrounds each of the conductive carbon particles so that a thin dielectric layer is present at the surface. The use of a conductive plastic eliminates the need for separate metal and dielectric layers on the disc surface and thus has simplified manufacture of the disc.

The disc described in the Fox et al application is made by forming a preform of the carbon black filled molding composition and placing the preform between the platens of a molding press. The heated platens are closed against the preform with pressure to cause the material of the preform to flow radially outwardly to fill the mold cavity provided by the platens. This method is described in the copending application of M. L. McNeely, Ser. No. 066,769, filed Apr. 30, 1979, entitled "Video Disc Preform and Method of Making a Disc Therefrom". The preform can be formed in a mold which automatically transfers the preform to the disc molding apparatus. Such a mold is shown in copending application of C. B. Carroll et al, Ser. No. 102,620, filed Dec. 11, 1979, now U.S. Pat. No. 4,281,816 entitled "Automatic Apparatus for Molding a Preform".

In the recorded disc disclosed in the Fox et al application although the carbon black particles are only required at the surfaces of the disc so as to provide electrically conductive surfaces, the carbon black particles extend completely throughout the entire volume of the disc. It would be desirable to limit the carbon black particles to the surfaces of the discs which would reduce the amount of carbon black used to make the disc and thereby reduce the cost of the disc.

Recorded discs having surface layers of a material different from the core of the disc are known and there are various techniques for making such laminated discs. One technique is to place a plurality of sheets, e.g. a sheet of the core material between two sheets of the outer material, between two platens of the mold. The heated platens are closed against the laminated sheets to bond the sheets together and impress the surface relief pattern into the surface layers. U.S. Pat. Nos. 3,247,298 to H. Utiger, issued Apr. 19, 1966, entitled "Method for the Production of Sound Records" and No. 3,584,094 to J. Rock et al, issued June 8, 1971, entitled "Method of Making Picture-Type Phonograph Records" illustrate this technique. Another technique is to place a preform of the core material between two sheets of the outer material between the mold platens. This is shown in U.S. Pat. No. 2,452,821 to L. A. Wood, Jr., issued Nov. 2, 1948, entitled "Method of Making Phonograph Records". Still another technique is to use a sheet of the core material between one or more preforms of the outer material. This is shown in U.S. Pat. Nos. 4,213,927 to J. D. Alberti, issued July 22, 1980, entitled "Method of Making Picture Phonograph Record" and 4,248,818 to K. Elizabeth, issued Feb. 3, 1981, entitled "Process for Making a Record".

A problem with each of the above techniques for making a laminated disc is that they require the handling of a plurality of parts, such as a plurality of sheets, or a sheet and one or more preforms. Therefore, it would be desirable to be able to make a laminated disc having a conductive outer layer surrounding a core material using a single preform of the type shown in the previously referred to McNeely application.

SUMMARY OF THE INVENTION

A method of making a laminated information recorded disc which has outer surface layers of a first material on opposite sides of a core material includes the steps of forming a preform having a surface layer of the first material surrounding the core material. The preform is placed between the platens of a molding press which, when heated, are closed against the preform to cause the materials of the preform to flow radially outwardly under the pressure of the platens until the materials fill the mold cavity provided between the platens to form the laminated disc. The molded disc is then cooled to harden the materials of the disc.

DETAILED DESCRIPTION OF THE INVENTION

Figure 1:
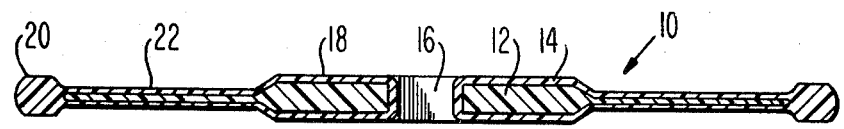
FIG. 1 is a sectional view of a laminated recorded disc made by the method of the present invention.

A recorded disc in the form of a video disc is generally designated as 10. The disc 10 is a substantially flat, circular plate having a core 12 of a core plastic material, and a surface layer 14 of a plastic material containing carbon black particles. The material of the surface layer 14 may be of the same composition described in the previously referred to Fox et al application. As shown, the surface layer 14 extends completely around the core 12 including the peripheral edge and the surface of the opening 16 through the center of the disc 10. However, it is not essential that the surface layer 14 extend across the peripheral edge of the core 12. Although the percent by weight of the disc 10 comprising the core 12 may vary, using the method of the present invention discs 10 have been made containing up to 69 percent by weight of the core 12. As shown, the disc 10 includes a center portion 18 which is unrecorded, a narrow outer rim 20 and an intermediate portion 22 on which the recorded information is contained.

It is necessary that the surface layer 14 be of a thermoplastic conductive molding compound suitable for achieving the recording and capacitive playback of information. Preferably, polyvinylchloride containing conductive carbon particles is used. However, the core 12 can be of any thermoplastic molding compound, preferably one which is less expensive than the material of the surface layer. Thus, the core 12 can be of the same plastic material as the surface layer 14 but without the carbon black particles, which add to the cost of the material, or of other polymer or copolymers of vinyl chloride. Alternatively, the core can be made of reground scrap conductive material. The scrap may be obtained from improperly molded discs and/or flash trimmed from the molded discs.

Figure 10:
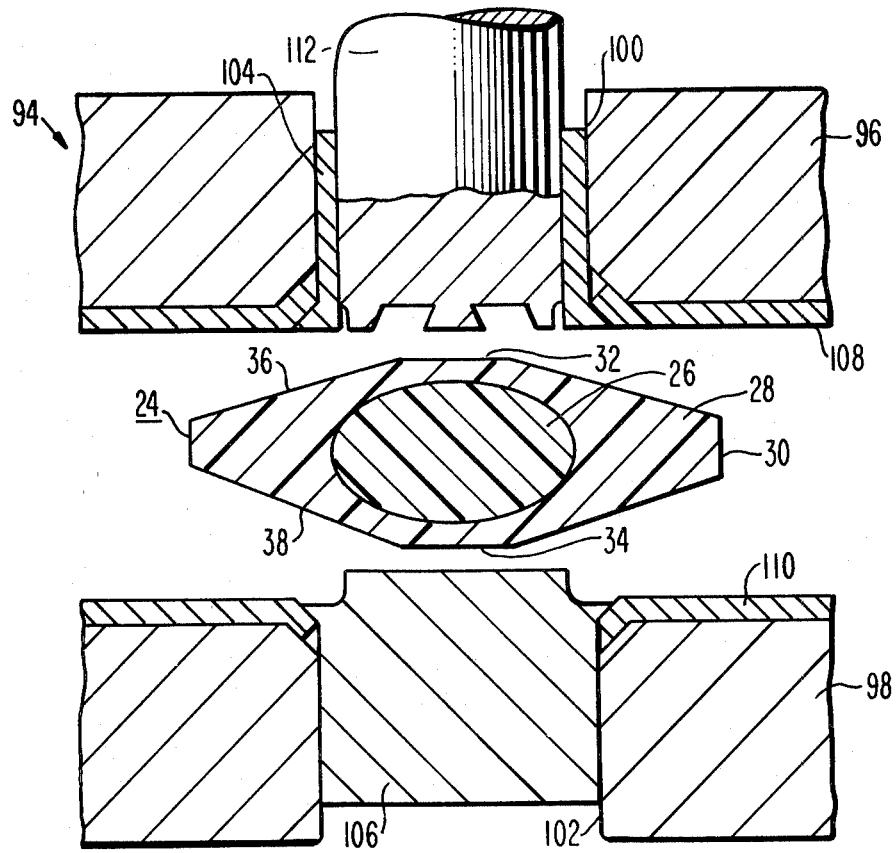
FIGS. 10 and 11 are sectional views of a portion of a compression molding apparatus showing the steps of the present invention for making a laminated disc.

The disc 10 is made from a preform 24 shown in FIG. 10. The preform is made up of a core portion 26 of the core thermoplastic and an outer portion 28 of the conductive plastic surrounding the core portion 26. The preform 24 is of a shape and size as described in the previously referred to application of McNeely. In general, the preform has a circular outer periphery 30, circular flat top and bottom surfaces 32 and 34, respectively, and conical surface portions 36 and 38 extending between the outer periphery 30 and the top and bottom surfaces 32 and 34, respectively. As described in the McNeely application, the purpose of this shape is to minimize surface defects in the completed molded disc 10 which could result from air or gasses being trapped between the preform 24 and the surfaces of the mold.

Figure 2:
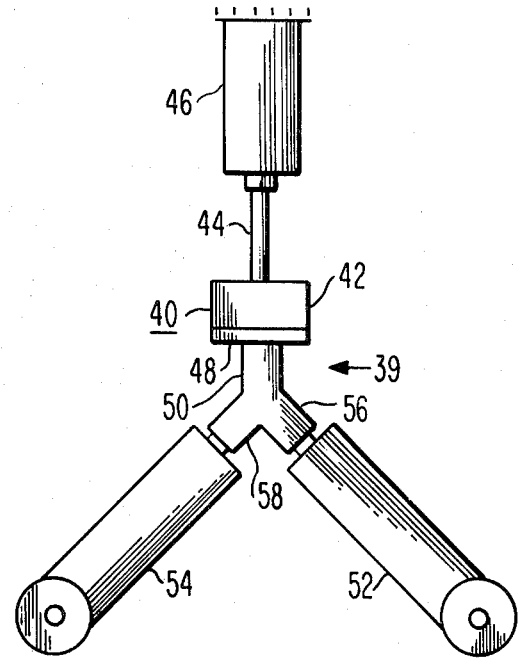
FIG. 2 is a schematic view of an apparatus for making the preform used in the method of the present invention.

Referring to FIG. 2, an apparatus suitable for making the preform 24 is generally designated as 39. The apparatus 39 includes a two piece mold 40, which will be described in detail hereinafter. The upper member 42 of the mold 40 is mounted on the end of the piston 44 of a hydraulic cylinder 46 to permit movement of the upper mold member 42 toward and away from the lower mold member 48 of the mold 40. A Y-shaped injection nozzle 50 is connected to the bottom of the lower mold member 48, and separate extruders 52 and 54 are connected to the arms 56 and 58 of the nozzle 50. One of the extruders, such as the extruder 52, contains the conductive plastic material and the other extruder, such as the extruder 54, contains the core plastic material, such as a nonconductive plastic.

Figure 3:
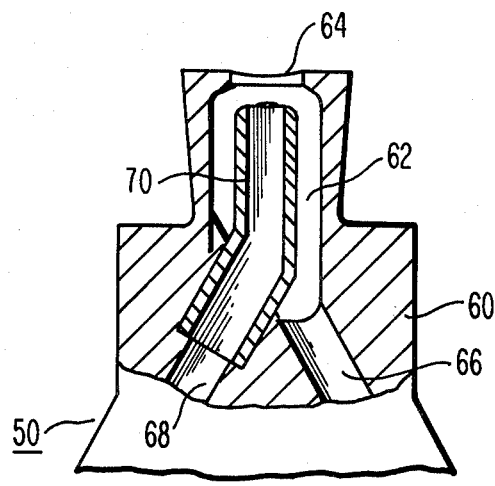
FIG. 3 is a partial sectional view of the injection nozzle used in the apparatus shown in FIG. 2.

Referring to FIG. 3, there is shown the leg 60 of the nozzle 50 which is the exit end of the nozzle 50. The leg 60 contains an elongated chamber 62 having an opening 64 at one end extending to the end of the leg 60. A passage 66 extends from the other end of the chamber 62 through the arm 56 of the nozzle 50. A second passage 68 extends from the other end of the chamber 62 through the arm 58 of the nozzle 50. A tube 70 extends along the chamber 62 having one end fitting into the end of the passage 68 and its other end being adjacent to but spaced from the opening 64. Thus, the tube 70 becomes an extension of the passage 68 and is within and is completely surrounded by the chamber 62.

Figure 4:
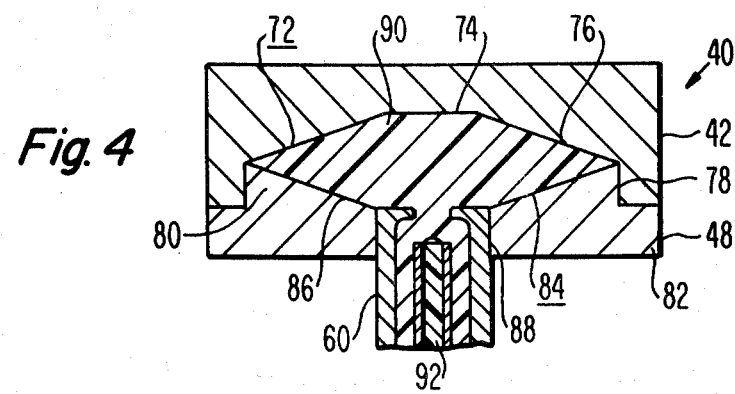
FIGS. 4-9 are sectional views of the preform mold showing the various steps of making the preform used in the method of the present invention.

As shown in FIG. 4, the upper mold member 42 has a concave mold cavity 72 in its surface which faces the lower mold member 48. The mold cavity 72 is shaped to correspond to the shape of a portion of the preform 24 in that it has a flat bottom portion 74, a conical portion 76 extending from the flat bottom portion 74 and a cylindrical portion 78 extending from the conical portion 76. The lower mold member 48 has a cylindrical portion 80 which is of a size to fit within the cylindrical portion 78 of the mold cavity 72, and a rim 82 projecting radially outwardly from the cylindrical portion 80. The lower mold member 48 has a concave mold cavity 84 in the surface of the cylindrical portion 78 which faces the upper mold member 42. The mold cavity 84 has a conical portion 86 extending from the periphery of the cylindrical portion 80 to an opening 88 through the lower mold member 48 to the bottom of the cavity 84. The end of the leg 60 of the nozzle 50 fits within the opening 88 so that the end of the leg 60 forms a substantially flat bottom portion of the mold cavity 84.

To form a preform 30 in the mold 40, the cylinder 46 is actuated to move the piston rod 44 and the upper mold member 42 toward the lower mold member 48 until the cylinder portion 80 of the lower mold member 48 is within the mold cavity 72 and the upper mold member 40 is seated on the rim 82 of the lower mold member 48. In this position of the mold parts 42 and 48, the volume within the mold cavities 72 and 84 is less than the desired volume of the preform 30. The extruder 52 is turned on to extrude conductive plastic material 90 through the passage 66 into the nozzle chamber 62 and through the opening 64 into the mold cavity, as shown in FIG. 4.

Figure 5:
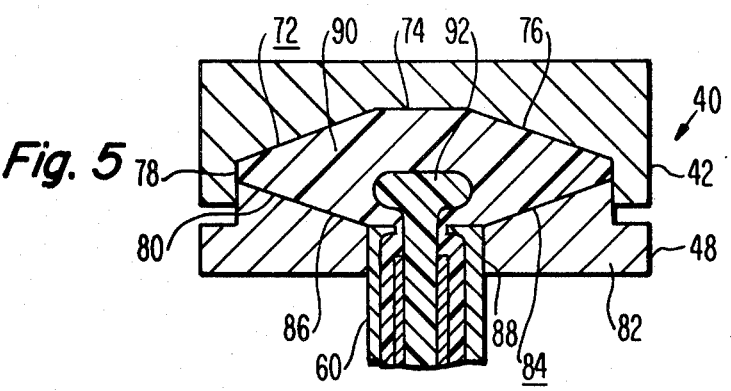
Figure 6:
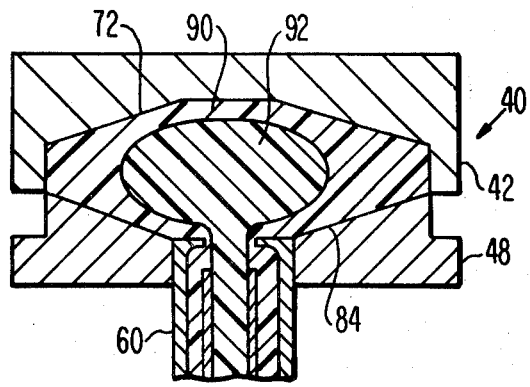

When the mold cavities 72 and 84 contain the desired amount of the conductive plastic material 90, the extruder 52 is turned off and the extruder 54 is turned on. This extrudes the core plastic material 92 through the nozzle passage 68, tube 70 and opening 64 into the mold cavities. As shown in FIG. 5, the core plastic material 92 is forced into the center of the conductive plastic material 90 in the mold 40 and forms the core portion 26 while forcing the conductive plastic material 90 outwardly. As the core plastic material 92 is forced into the conductive material 90, the upper mold member 42 is forced away from the lower mold member 48 to enlarge the volume within the mold cavities 72 and 84 until the edge of the cylindrical portion 80 of the lower mold member 48 is at the end of the cylindrical portion 78 of the mold cavity 72. As shown in FIG. 6, in this position of the mold members 42 and 48, the volume formed by the mold cavities 72 and 84 is equal to the desired volume of the preform 30.

Figure 7:
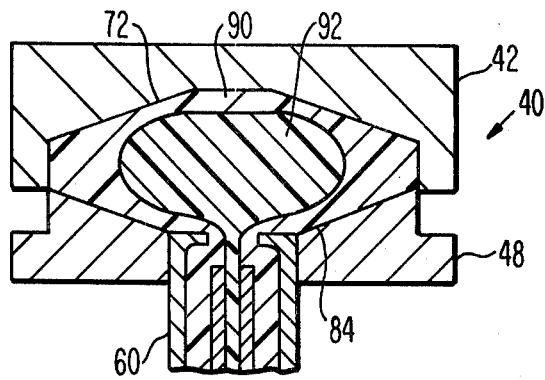
Figure 8:
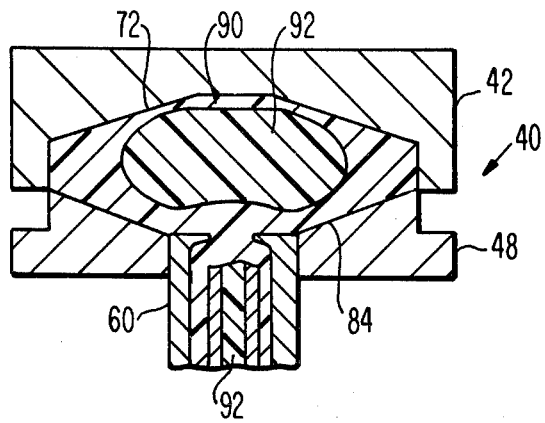
Figure 9:
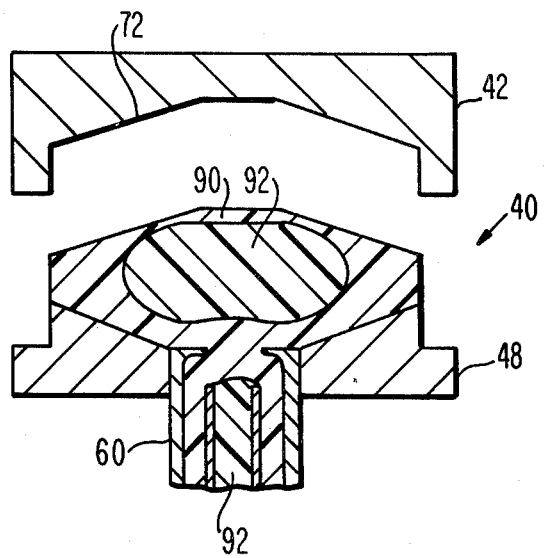

When the desired amount of the core plastic material 92 has been extruded into the mold cavities 72 and 84, the extruder 54 is turned off and the extruder 52 is turned on again. As shown in FIG. 7, this causes some conductive plastic material 90 to be extruded into the opening 64 in the nozzle 50 to pinch off the core plastic material 92 and provide the outer layer portion 28 of the conductive plastic material 90 completely around the core 26, as shown in FIG. 8. The extruder 52 is then turned off and the cylinder 46 is actuated to move the mold member 42 away from the mold member 48. This exposes the preform 30 in the mold 40 so that it can be removed from the mold.

The proper amount of each of the conductive and core materials extruded into the mold 40 is controlled by the amount of time that each extruder 52 and 54 is turned on. The cycling of the extruders 52 and 54 can be controlled by adjustable timers connected in the electrical circuits operating the extruders. Alternatively, the amount of core material extruded into the mold 40 can be controlled by a limit switch on the upper mold member 42 which is activated when the mold members separate the desired distance.

In order to inject the plastic materials into the mold 40 they are heated to a temperature which permits them to flow. When the conductive plastic material 90 is injected into the mold cavities 72 and 84, it impinges on the surface of the mold cavity 72, which is cooler than the plastic material 90, and cools slightly to start the formation of the preform 30. Additional plastic material, either conductive or core material, entering the mold cavities 72 and 84 flows to the center of the mold cavities and displaces the hottest material which has the lowest viscosity. The conductive plastic material 90 which contacts the surfaces of the mold cavities cools the most so as to become sufficiently rigid to maintain the shape of the preform and allow it to be removed from the mold 40 when the mold members 42 and 48 are completely separated. Also, by using a three part mold of the type shown and described in the previously referred to Carroll et al application, the completed preform can be automatically transferred from the mold to a disc molding press.

Figure 11:
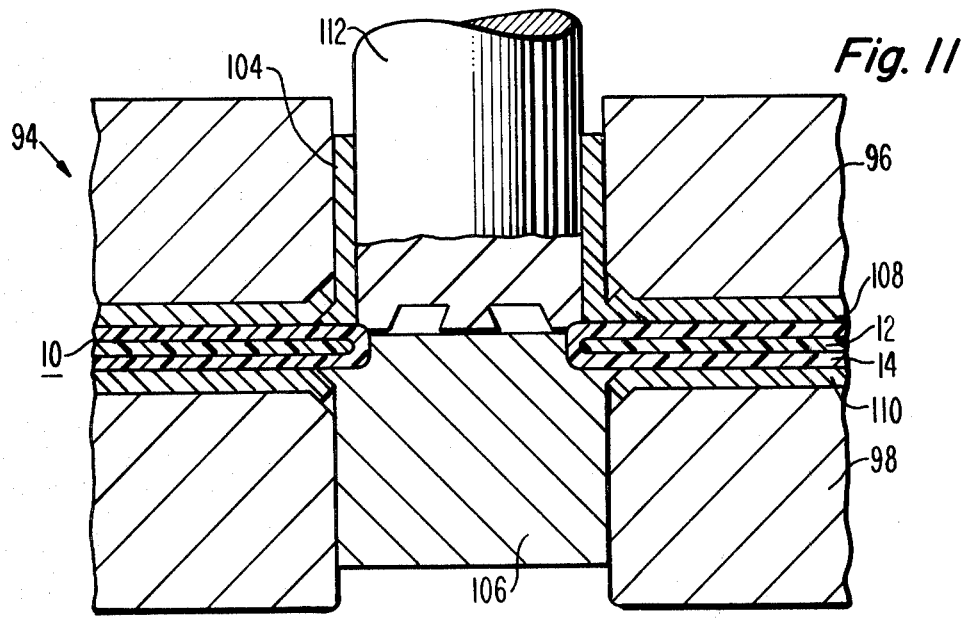

To form a disc 10 from the preform 24, the preform 24 is placed in a mold press 94, a portion of which is shown in FIGS. 10 and 11. The mold press 94 includes upper and lower platens 96 and 98 which are mounted so that at least one of them is movable toward and away from the other. The platens 96 and 98 have aligned central openings 100 and 102 respectively therethrough in which are mounted center plates 104 and 106 respectively. Stampers 108 and 110 are mounted on the opposed surfaces of the platens 96 and 98 respectively. The stampers 108 and 110 are thin metal plates having on the surface thereof the negative of the impression to be applied to the surface of the disc 10. The stampers 108 and 110 are in part secured to the platens 96 and 98 by the center plates 104 and 106 respectively. A center hole forming pin 112 extends through and is slidable in the center plate 104 of the upper platen 96.

In making a recorded disc 10, the platens 96 and 98 are separated and the preform 24 is placed therebetween with the top and bottom surfaces 32 and 34 of the preform 24 being directly between the center plates 104 and 106. The platens 96 and 98, center plates 104 and 106 and center hole forming pin 112 are heated and the platens 96 and 98 are moved toward each other to contact the preform 24. The heat from the platens 96 and 98 heat the preform 24 so that as the platens 96 and 98 are moved closer together the heated materials of the preform 24 will be forced radially outwardly to completely fill the mold cavity provided between the platens 96 and 98 when they are completely closed. The center hole pin 112 is moved through the material of the preform 24 so as to push the material thereunder aside to form a center hole in the disc 10 as shown in FIG. 11. When the platens 96 and 98 are completely together and the center hole pin 112 has been forced through the material of the preform 24, the platens 96 and 98 and the center hole forming pin 112 are cooled to cause the material of the disc 10 to harden. The platens 96 and 98 are then moved apart to permit removal of the completed disc 10.

I have found that when the material of the preform 24 is formed radially outwardly by the platens 96 and 98, the material of the core portion 26 will flow radially outwardly but remain within the conductive material of the outer portion 28 to form the disc 10 having the core 12 with the surface layer 14 of the conductive material. Also, when the center hole forming pin 112 is pushed through the material of the preform 24 the conductive material 90 will be pushed through the hole formed in the disc so that the surface of the hole is coated with the conductive material.

However, in order to prevent the core material 92 from breaking through the conductive material 90 to the surface during the pressing of the disc 10, the core material 92 must be of a viscosity approximately equal to or greater than the viscosity of the conductive material 90. The viscosity of each of the materials at the time that the preform is pressed into a disc depends on the composition of the particular materials used and the temperature of the material at the time the preform is pressed. The temperature of the particular materials of the preform will depend on the temperature cycle that the materials undergo starting with the injection of the materials into the preform mold 40. At the time that the molding of the preform 24 is completed, the outer portion 28 of the conductive material 90 may be cooler and therefore of a higher viscosity than the core portion 26 of the core material 92. By the time that the preform 24 is transferred from its mold 40 to the mold press 94 the temperature difference between the outer portion 28 and the core portion 26 may decrease depending on the delay time in transferring the preform 24 to the mold press 94. If the temperature difference decreases, the viscosity difference between the two portions also decrease. When the heated platens 96 and 98 of the mold press 94 are brought into contact with the preform 24, the outer portion 28 will increase in temperature faster than the core portion 26. Thus, the viscosity of the outer portion 28 will decrease relative to the viscosity of the core portion 26. By controlling the temperature of the platens 96 and 98 and the mold time cycle, the viscosity of the outer portion 28 can be lowered to be substantially equal to or less than that of the core portion 26 as the preform 26 is being compressed to form the disc 10.

EXAMPLE I

Preforms of the type shown in FIG. 10 were made using an apparatus such as shown in FIG. 2. The preforms were made of 114 grams of a conductive outer plastic and 54 grams of an inner nonconductive plastic so as to provide 32% by weight of nonconductive material in the preform. The conductive material was a polyvinylchloride based plastic containing finely divided carbon black particles and conventional additives such as disclosed by Martin et al in U.S. Pat. No. 4,228,050. The nonconductive material was a polyvinylchloride containing titanium dioxide pigments and lubricants. The extruders used were ¾" screw Brabender extruders. Each extruder was heated at its entrance end, into which the material was fed, to 160° C.; at its exit end adjacent the nozzle to 180° C.; and intermediate its ends to 170° C. The arms of the nozzle were heated to 180° C. The extruder for the conductive plastic was rotated at 100 RPM and the extruder for the nonconductive core plastic was rotated at 80 RPM. Each of the mold members was heated to 270° F. (132° C.). The preforms made were placed in a 4-post press which was similar to that shown in FIG. 10 except that there was no center hole forming pin and the center portions of both stampers were secured to the mold plates by center plates having relatively flat surfaces. Sixteen discs were made having a nonconductive core with a conductive outer layer. No breakthrough of the white core material was obtained. Center holes were individually punched through each of the discs.

EXAMPLE II

Preforms were made in the same manner as in EXAMPLE I except that each preform contained 102 grams of the outer conductive plastic and 66 grams of the inner nonconductive plastic to provide 39% by weight of the nonconductive plastic. The preforms were made into discs as described in EXAMPLE I to make three discs.

EXAMPLE III

Preforms were made in similar manner as in EXAMPLE I except that each preform contained 52.5 grams of the outer conductive plastic and 106 grams of the inner nonconductive plastic to provide 66.9% by weight of the nonconductive plastic. Also, the extruders' arms of the nozzle were heated as follows:

|  | Conductive Plastic | Nonconductive Plastic |
|---|---|---|
| Entrance End | 170° C. | 160° C. |
| Intermediate | 180° C. | 165° C. |
| Exit End | 185° C. | 170° C. |
| Nozzle | 175° C. | 175° C. |

The extruder for the conductive plastic was rotated at 100 rpm and the extruder for the nonconductive plastic was rotated at 20 rpm. The top mold member was heated to 240° F. (115.6° C.) and the bottom mold member was heated to 260° F. (126.7° C.). Using the preforms 12 discs were molded in the manner described in EXAMPLE I.

EXAMPLE IV

Preforms were made in the same manner as described in EXAMPLE III except that each preform contained 53 grams of conductive plastic and 106 grams of nonconductive plastic to provide 66% by weight of the nonconductive plastic. The preforms were molded into discs in a molding press made by Alpha-Toolex Company in Sweden. The press is of a construction as shown in FIG. 10. Ten discs were made having molded-in center holes with the nonconductive plastic layer extending across the wall of the hole.

EXAMPLE V

Preforms were made in similar manner as in Example I except that each preform contained 49 grams of the outer conductive plastic and 119 grams of the inner nonconductive plastic to provide 70.8% by weight of the nonconductive plastic. Also, the extruder's arms of the nozzle were heated as follows:

|  | Conductive Plastic | Nonconductive Plastic |
|---|---|---|
| Entrance End | 170° C. | 155° C. |
| Intermediate | 180° C. | 155° C. |
| Exit End | 190° C. | 155° C. |
| Nozzle | 170° C. | 160° C. |

The extruder for the conductive plastic was rotated at 130 rpm and the extruder for the nonconductive plastic was rotated at 180 rpm. The preform mold had cylindrically shaped mold members which were heated at 280° F. (138° C.). Using the preforms eight discs were molded in the manner described in EXAMPLE I. In making these discs the time between taking the preforms from the preform mold and placing the preforms in the disc mold was varied. Three of the discs were molded from preforms transferred directly from the preform mold to the disc mold with a delay of slightly less than 15 seconds. One disc was molded from a preform in which the transfer delay was one cycle of the disc molding press, slightly greater than 45 seconds. Three discs were molded from preforms in which the transfer delay was two cycles of the disc molding press, slightly greater than 90 seconds. One disc was molded from a preform on which the transfer delay was three cycles of the disc molding press, slightly greater than 135 seconds.

Some breakthrough of the nonconductive inner plastic was visible on all the discs produced. However, it was found that the amount of breakthrough decreased with the increase in delay time in transferring the preform to the disc molding press. The discs formed from preforms transferred immediately to the disc molding press had the worst breakthrough whereas the discs made from the preform having a transfer delay of three press cycles had a considerably reduced amount of breakthrough. The breakthrough on these discs are a result of pressing a preform which contains an inner material having a lower melt viscosity than the outer material. By molding the preforms in a mold which is at a temperature lower than the temperature of the extruded plastic, the outer material of the molded preform will be at a lower temperature than the inner material so that the viscosities will be different. As the delay time in transferring the preform to the disc molding press increases, the inner material becomes cooler resulting in a more uniform temperature distribution across the preform. This results in the viscosities of the two materials becoming closer. As the viscosities of the two materials become closer, there is less breakthrough of the inner material as shown by the above results.

I claim:

1. A method of making a laminated recorded disc which has an outer surface layer of a first thermoplastic material on opposite sides of a thermoplastic core material comprising the step of
   (a) forming a preform having a surface layer of the first material completely surrounding the core material,
   (b) placing said preform between the platens of a molding press,
   (c) heating the platens and closing them against the preform to heat the preform to a temperature at which the materials of the preform flow radially outwardly under the pressure of the platens until the materials fill the mold cavity provided between the platens to form the laminated disc, and then
   (d) cooling the molded disc to harden the materials of the disc.

2. The method in accordance with claim 1 in which the first material is a conductive plastic and the core material is a nonconductive plastic.

3. The method in accordance with claim 1 in which the first material is a conductive plastic and the core material is reground scrap of the same composition as the first material.

4. The method in accordance with claims 2 or 3 in which the first material is a plastic mixed with finely divided particles of carbon black.

5. The method in accordance with claim 4 in which the plastic of each of the first and core materials is a polyvinylchloride.

6. The method in accordance with claim 1 in which the preform is formed by extruding the first material into a mold and then extruding the core material into the first material in the mold to form the core within the first material.

7. The method in accordance with claim 6 in which the viscosities of the first and core materials are controlled so that the core material has a viscosity approximately equal to or greater than that of the first material.

8. The method in accordance with claim 6 in which the mold includes portions which fit together to form a mold cavity volume smaller than the desired volume of the preform and then move apart to expand the volume of the cavity to the desired volume of the preform, the first material is extruded into the mold cavity when the volume is smaller than the desired volume of the preform and the core material is extruded into the first material to move the portions apart to expand the volume of the cavity to the desired volume of the preform.

9. The method in accordance with claim 6 in which after the core material is extruded into the first material an additional amount of the first material is extruded into the mold to completely enclose the core material with the first material.

10. The method in accordance with claim 1 in which one of the platens has a center hole forming pin therein which when the platens are closed against the preform is moved through the materials of the preform to displace the materials and form a hole in the disc.

11. The method in accordance with claim 10 in which the center hole forming pin pushes some of the first material along the surface of the hole formed in the disc so that the core material is covered by the first material in the hole.

* * * * *